United States Patent [19]

Isobe et al.

[11] Patent Number: 6,078,623
[45] Date of Patent: Jun. 20, 2000

[54] DATA TRANSMISSION APPARATUS AND METHOD

[75] Inventors: Tadaaki Isobe; Bunichi Fujita, both of Hadano, Japan

[73] Assignee: Hitachi, Ltd., Tokyo, Japan

[21] Appl. No.: 08/894,914

[22] PCT Filed: Mar. 20, 1995

[86] PCT No.: PCT/JP95/00502

§ 371 Date: Sep. 2, 1997

§ 102(e) Date: Sep. 2, 1997

[87] PCT Pub. No.: WO96/29655

PCT Pub. Date: Sep. 26, 1996

[51] Int. Cl.⁷ .................................................. H04L 27/00
[52] U.S. Cl. ........................ 375/259; 375/214; 375/288; 713/400; 713/503
[58] Field of Search ................................. 375/214, 259, 375/288, 295; 370/452; 713/400, 503

[56] References Cited

U.S. PATENT DOCUMENTS

| | | | |
|---|---|---|---|
| 4,878,219 | 10/1989 | Kaufman et al. | 370/452 |
| 4,881,165 | 11/1989 | Sager et al. | 713/400 |
| 4,945,548 | 7/1990 | Iannarone et al. | 375/214 |
| 5,623,944 | 4/1997 | Self et al. | 713/503 |

*Primary Examiner*—Stephen Chin
*Assistant Examiner*—Lenny Jiang
*Attorney, Agent, or Firm*—Antonelli, Terry, Stout & Kraus, LLP

[57] ABSTRACT

A transmission apparatus capable of transferring data between a transmitting and a receiving device using a small-scale, low-cost hardware implementation for high-speed data transmission, the apparatus being conducive to reducing the amount of system design work on a target system. The transmitting device sends to the receiving device both data and a reference signal generated by a reference signal generation circuit. On the receiving side, a phase adjustment circuit delays the reference signal and a phase determination/phase amount control circuit brings the delayed signal into phase with a receiving-side clock signal. A data signal group is given the same amount of delay as the reference signal. The scheme allows data signals to be received directly in keeping with the receiving-side clock signal, eliminating the need for strict clock skew management, massive detours of data transmission lines or a wasteful wait time required for signal values to be established.

8 Claims, 11 Drawing Sheets

Ts AND Th DEFINED FOR FLIP-FLOPS

DATA TRANSMISSION APPARATUS AND METHOD

The present invention relates to an apparatus and a method for data transmission as well as to a parallel processor system using the apparatus and the method. More particularly, the invention relates to an apparatus and a method for parallelly transmitting a plurality of bits of data and a parallel processor system utilizing the apparatus and the method.

Conventional processor systems each includes a plurality of processors that transmit data between the component processors typically using one of the following two data transmission methods:

The first method involves transmitting data in complete synchronism with a system clock, commonly adopted by processor systems. FIG. 2 is a block diagram of a conventional data transmission setup using the first data transmission method. In a processor system of FIG. 2, reference numeral 200 stands for a transmitting-side LSI, 210 for a printed circuit board carrying the LSI 200, 250 for a receiving-side LSI, and 260 for a printed circuit board carrying the LSI 250. With the first data transmission method in use, the process system includes a single generator 290. The generator 290 generates a system clock signal that is distributed via clock buffer gates 291 through 296 (part of the distribution section) to flip-flop groups 201 and 251 on a low-skew basis inside the processor system. It is necessary for data transmission to take place between the flip-flops over transmission lines 280 exactly n times the system clock cycle (i.e., machine cycle). This requires designing the transmission lines so as to control strictly the amount of delay over the lines between the transmitting-side flip-flop group 201 and the receiving-side flip-flop group 251 (including logic gate groups 202 and 252 on the lines). The processor system is actually built on the basis of that design. If the data transmission time exceeds one machine cycle, it is imperative to devise a transmission line design to meet two requirements: that a maximum calculated delay time should fall within n machine cycles when the calculations take into account the system clock skew and the propagation time differences stemming from manufacturing variations of semiconductors constituting the transmission lines; and that a minimum calculated delay amount should exceed (n−1) machine cycles when the calculations take into account the hold time of the receiving-side flip-flops. Below are typical expressions by which to make the calculations for the setup in FIG. 2:

Maximum delay time, obtained by $$Tpd0+Tpdv+Ts+Tskew<n*\text{machine cycle}$$

Minimum delay time, acquired by $$Tpd0-Tpdv-Th-Tskew>(n-1)*\text{machine cycle}$$

where

Tpd0=average delay time from clock input to group 201 until data input to group 251, Tpdv=variations of Tpd0, Tskew=absolute difference in time between 293a and 296a (clock skew), Ts=setup time of group 251, Th=hold time of group 251.

The flip-flop setup time Ts and the flip-flop hold time Th are defined as depicted in FIG. 15.

The second data transmission method conventionally utilized works typically as follows: the transmitting side transmits data to the receiving side together with a clock signal synchronized with the data, while the receiving side receives the data in keeping with the transmitted clock signal and places the received data into registers from which the data are moved to other registers in synchronism with a receiving-side clock signal. A typical setup of the second method is shown in FIG. 3. Inside a transmitting-side LSI 300, a flip-flop group 301 is supplied with a transmitting-side clock signal. The same clock signal is also sent along with data to a receiving-side LSI 350 via an output buffer gate 303 and a clock transmission line 381. On the receiving side, a flip-flop group 351 is fed with both the data sent over data transmission lines 380 and the clock signal transmitted via a buffer gate 353. The data are held by the flip-flop circuit 351 in keeping with the simultaneously transmitted clock signal. The transmitting-side LSI 300 is mounted on a printed circuit board 310 and the receiving-side LSI 350 on a printed circuit board 360. Buffer gates 302 and 352 are used for data transmission. Reference numerals 391 through 393 and 396 through 398 denote clock buffer gates.

Circuits inside the receiving-side LSI 350 operate on a clock signal from a generator 395 furnished separately from the transmitting-side clock generator 390. To transmit data to the registers operating on the generator 395 requires performing a process of synchronization. The synchronization process is needed to deal with what is known as a metastable state in which the output value of a receiving-side flip-flop can be unstable (neither "0" nor "1") if the data input value to that flip-flop is changed at the time of a change in the clock signal to the same flip-flop. The metastable state is discussed illustratively in "Principles of CMOS VLSI Design (second edition), Addison Wesley, pp. 337–340" (reference 1). How long it takes for the metastable state to disappear is dependent on the kind of semiconductors in use, the circuit design in effect, the production process adopted, and other factors. Flip-flop groups 356 and 357 in FIG. 3 are included so as to perform the above-mentioned synchronization process. Specifically, the flip-flop group 356 gets the received data using the clock signal of the data-receiving side. Upon elapse of a period to have the output values established, the flip-flop group 357 accepts the data for use in downstream logic operations.

If the metastable state of flip-flops lasts longer than the machine cycles of the system (i.e., generation cycles of the generators 390 and 391), a plurality of synchronizing flip-flop groups 356 may be provided and operated in turns. Whereas the setup of FIG. 3 uses separate generators to supply clock signals to the transmitting-side LSI 300 and receiving-side LSI 350, an alternative setup may utilize a single generator for the transmitting-side and receiving LSI's. In the latter case, there is no need to design a strict clock skew averting scheme such as the one shown in FIG. 2.

Techniques for system synchronization are proposed illustratively by Japanese Patent Laid-Open No. Hei 2-226316, "Semiconductor Device."

In the processor system of FIG. 2, the value of system clock skew affects data transmission time significantly. The amount of data transmission delay over data transmission lines must be within the constraints of minimum and maximum delay times. As systems are getting larger in scale and their operation speeds faster, it has become increasingly difficult to keep the clock skew amount in check. To implement low-skew systems requires imposing ever-more stringent conditions on semiconductor technologies. The requirements of maximum and minimum delays are generally met by making line detours (such as patterns of wiring and signal cables) to increase the delays. As a result, the scale of hardware necessary for detour-making wires and board portions has increased. With levels of techniques for hardware implementation (i.e., of signal wiring and board arrangement) getting more demanding than ever, manufacturing costs are soaring and system design is getting progressively difficult. These constraints lead to a major challenge: signal transmission delays tend to be excessive the greater the signal length typically in a parallel processor system incorporating a data transmission network for high-speed data transfer between the component processors. How to overcome that challenge is a key point in building a viable parallel processor system.

Furthermore, in the setup of FIG. 2, meeting the requirements of maximum and minimum delay times in turn restricts operable frequencies (i.e., machine cycles) of the system, which can be a severe constraint on the flexibility of the system. This poses another important challenge to the parallel data processor system configuring numerous general-purpose microprocessors. The system requires the operable frequencies of its component microprocessors to be wide enough in bandwidth to ensure good system performance.

The processor system of FIG. 3 is not subject to strict clock skew restrictions such as those of the setup of FIG. 2. Instead, the amount of delay variations between parallelly transmitted bits must be held below a predetermined level (i.e., less than a maximum out-of-phase amount letting the receiving-side flip-flops hold the received values in keeping with the simultaneously transmitted clock signal) over lines between the transmitting-side LSI and the receiving-side LSI.

Viewed from a system level point of view, the setup of FIG. 3 uses a two-stage flip-flop arrangement to supply the receiving-side LSI logic circuits with the received data. In the two-stage flip-flop arrangement, delays stemming from the forwarding of data to downstream circuits prolong data transmission time (i.e. network latency on a network) at the system level.

SUMMARY OF THE INVENTION

It is therefore an object of the present invention to overcome the above and other deficiencies of the prior art and to provide an apparatus and a method for implementing high-speed data transmission without the need for strict control of delays between flip-flops or for rigid clock skew management.

It is another object of the present invention to provide an apparatus and a method for concentrating facilities for implementing high-speed data transmission as much as possible, thereby minimizing the scale and overhead of logic circuitry for accelerated data transmission.

It is a further object of the invention to provide a parallel processor system comprising numerous processors wherein a small amount of hardware is sufficient to provide high-speed data communication between the component processors.

In carrying out the invention and according to one aspect thereof, there is provided a data transmission apparatus including a transmitting device, a receiving device, and a data transmission line for transmitting a data signal from the transmitting device to the receiving device. The transmitting device has a signal circuit for outputting a first signal having a specific relation in phase to the data signal. The first signal is sent from the transmitting device to the receiving device over a signal transmission line. The data transmission line and the signal transmission line are devised so that phase differences between the data signal and the first signal fall within a predetermined range. The receiving device includes: registers for receiving a second data signal in response to a clock signal of the receiving device; a determination circuit for determining relations between the clock signal and the first signal; and a phase adjustment circuit for adjusting the data signal in phase on the basis of the determined relations and outputting the adjusted signal as a second data signal.

In a preferred structure according to the invention, the determination circuit determines relations in phase between the clock signal and the first signal.

In another preferred structure according to the invention, the signal circuit outputs the first signal that is out of phase with the data signal by an amount corresponding to a period of time required by the registers to receive the data signal. The determination circuit checks to see if there is a match in switching edge between the clock signal and the first signal. The determination circuit further causes the phase adjustment circuit to adjust the data signal in phase in the event of a switching edge mismatch. The phase adjustment circuit outputs the adjusted signal as the second data signal.

In a further preferred structure according to the invention, the signal circuit outputs the first signal whose phase is controlled so that a switching edge of the first signal is positioned in the middle of a minimum switching time of the data signal. The determination circuit checks to see if there is a match in switching edge between the clock signal and the first signal. The determination circuit further causes the phase adjustment circuit to adjust the data signal in phase in the event of a switching edge mismatch. The phase adjustment circuit outputs the adjusted signal as the second data signal.

In an even further preferred structure according to the invention, the signal circuit outputs the first signal which is substantially in phase with the data signal. The determination circuit checks to see if a switching edge of the first signal falls within a specific period including a switching time of the clock signal. The determination circuit further causes the phase adjustment circuit to adjust the data signal in phase in the event of the switching edge of the first signal falling within the specific period. The phase adjustment circuit outputs the adjusted signal as the second data signal.

According to another aspect of the invention, there is provided a data processing system comprising at least two transmitting-receiving devices interconnected for transmitting and receiving data signals of a plurality of bits therebetween in a bidirectional parallel data transfer. One of the two transmitting-receiving devices includes: a first transmission circuit for transmitting a first data signal of a plurality of bits in response to a first clock signal; a first reception circuit for receiving a fourth data signal of a plurality of bits in response to the first clock signal; and a signal circuit for outputting a first signal having a specific relation in phase to the first data signal. The other transmitting-receiving device includes: a second reception circuit for receiving a second data signal of a plurality of bits in response to a second clock signal; a second transmission circuit for transmitting a third data signal of a plurality of bits in response to the second clock signal; a determination circuit for determining relations in phase between the second clock signal and the first signal; a first phase adjustment circuit for adjusting the first data signal in phase on the basis of the determined relations and outputting the adjusted signal as the second data signal; and a second phase adjustment circuit for adjusting the third data signal in phase on the basis of the determined relations and outputting the adjusted signal as the fourth data signal. Between the two transmitting-receiving devices, the first data signal is transmitted over a first transmission line, the fourth data signal is sent over a second transmission line, and the first signal is conveyed over a third transmission line. The first, the second and the third transmission lines are devised so that phase differences of the first signal over the respective lines fall within a predetermined range.

According to a further aspect of the invention, there is provided a data processing system comprising two transmitting-receiving devices interconnected for transmitting and receiving data signals therebetween in a bidirectional parallel data transfer. Between the two transmitting-receiving devices, a first data signal is transmitted over a first transmission line, a second data signal is sent over a second transmission line, and an information signal about the first data signal is conveyed over a third transmission line. One of the two transmitting-receiving devices is supplied with a first clock signal, transmits the first data signal and the information signal to the other transmitting-receiving device, and receives the second data signal from the other transmitting-receiving device. The other transmitting-receiving device is supplied with the information signal and the second clock signal, receives the first signal from the opposite transmitting-receiving device, and transmits the second signal to the opposite transmitting-receiving device.

According to an even further aspect of the invention, there is provided a parallel processor comprising a plurality of processing nodes and a communication network for interconnecting the plurality of processing nodes. A local processing node includes: a transmission circuit for transmitting a first data signal; a signal circuit for transmitting a first signal having a specific relation in phase to a data signal to be transmitted; registers for receiving a second data signal in response to a clock signal of the local processing node; a determination circuit for determining relations between the clock signal and the first signal transmitted from another processing node; and a phase adjustment circuit for adjusting the first data signal in phase from the another processing node on the basis of the determined relations and outputting the adjusted signal as the second data signal. The communication network interconnecting the processing nodes includes a data transmission line for transmitting the first signal and a signal transmission line for transmitting the first signal. The data transmission line and the signal transmission line are devised so that phase differences between the data signal and the first signal fall within a predetermined range.

According to a yet further aspect of the invention, there is provided a data transmission method for use with a system comprising a transmitting device, a receiving device, and data transmission lines for transmitting a data signal from the transmitting device to the receiving device. The data transmission method comprises the steps of: causing the transmitting device to output a first signal having a specific relation in phase to the data signal by use of a transmission line devised so that phase shift differences between the data signal over the data transmission line and the first signal over the transmission line fall within a predetermined range; and causing the receiving device to determine relations between a clock signal of the receiving device and the first signal, to adjust the data signal in phase on the basis of the determined relations in order to output the adjusted signal as a second data signal, and to receive the second data signal in response to the clock signal.

In one of the inventive setups outlined above, a plurality of transmitting-receiving devices exchange data therebetween. The transmitting-side device transmits data along with a reference signal indicative of the phase of the transmitted data. The receiving-side device receives both the data and the reference signal in such a way that keeps their phase difference constant. This is accomplished by eliminating differences in lengths between the data and the reference signal lines on the printed circuit board. The receiving-side device delays the transmitted reference signal so as to bring it in phase with a receiving-side clock signal. The same amount of delay is also applied to the received data. This makes it possible to let registers of the receiving-side device correctly retain the received data in direct synchronism with the receiving-side clock signal.

In another inventive setup where a switching edge of the reference signal is to be positioned in the middle of a minimum switching time of the data signal, the switching edge of the received reference signal is made to coincide with that of the receiving-side clock signal. At the same time, the received data is given the same amount of delay as the reference signal. This allows the switching edge of the receiving-side clock signal to be positioned substantially in the middle of the switching time of the received data, whereby data reception is performed correctly.

In a further inventive setup where the data signal and the reference signal are made to match in phase, the received reference signal is delayed so that its switching edge will not fall within a predetermined period including the switching edge of the receiving-side clock signal. The scheme is intended to prevent the received data from changing near a switching edge of the receiving-side clock signal, whereby data reception is carried out in a stable manner.

Furthermore, in a bidirectional data transfer between transmitting-receiving devices, a predetermined phase difference is maintained during a data transmission period between the data sent from the device that outputs the reference signal on the one hand, and the data transmitted in the opposite direction on the other hand. In that case, the transmitted data is delayed by the same amount as the received data inside the device that receives the reference signal. That is, only one of the two communicating devices has a data phase adjustment circuit allowing registers to receive bidirectionally transmitted and received data in direct synchronism with the receiving-side clock signal. In addition, a plurality of processors making up a network in a parallel processor system may each have the above-mentioned data phase adjustment circuit, whereby data transmission is accomplished with low network latency.

BEST MODE FOR CARRYING OUT THE INVENTION

The present invention will now be described in detail with reference to the accompanying drawings.

FIG. 1 is a block diagram of a data transmission system that comprises a data transmission facility embodying the invention. Unless otherwise noted, each flip-flop in this embodiment of the invention is an edge trigger type flip-flop that accepts a data signal at a leading edge of a clock signal. Described below is how data is illustratively transmitted from a transmitting-side LSI 10 on a printed circuit board 19 to a receiving-side LSI 20 on a printed circuit board 29.

Figure 1:
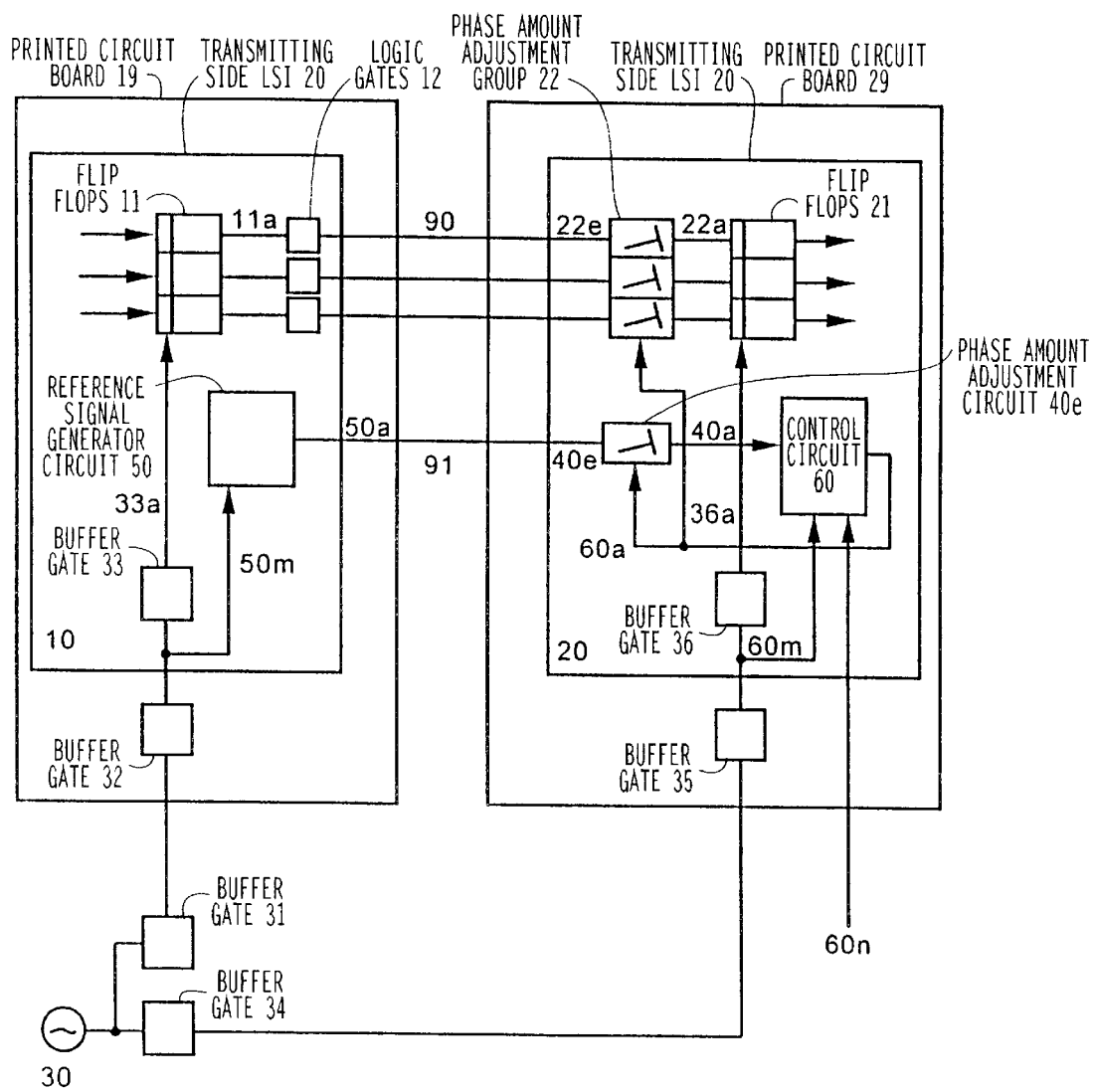
Figure 2:
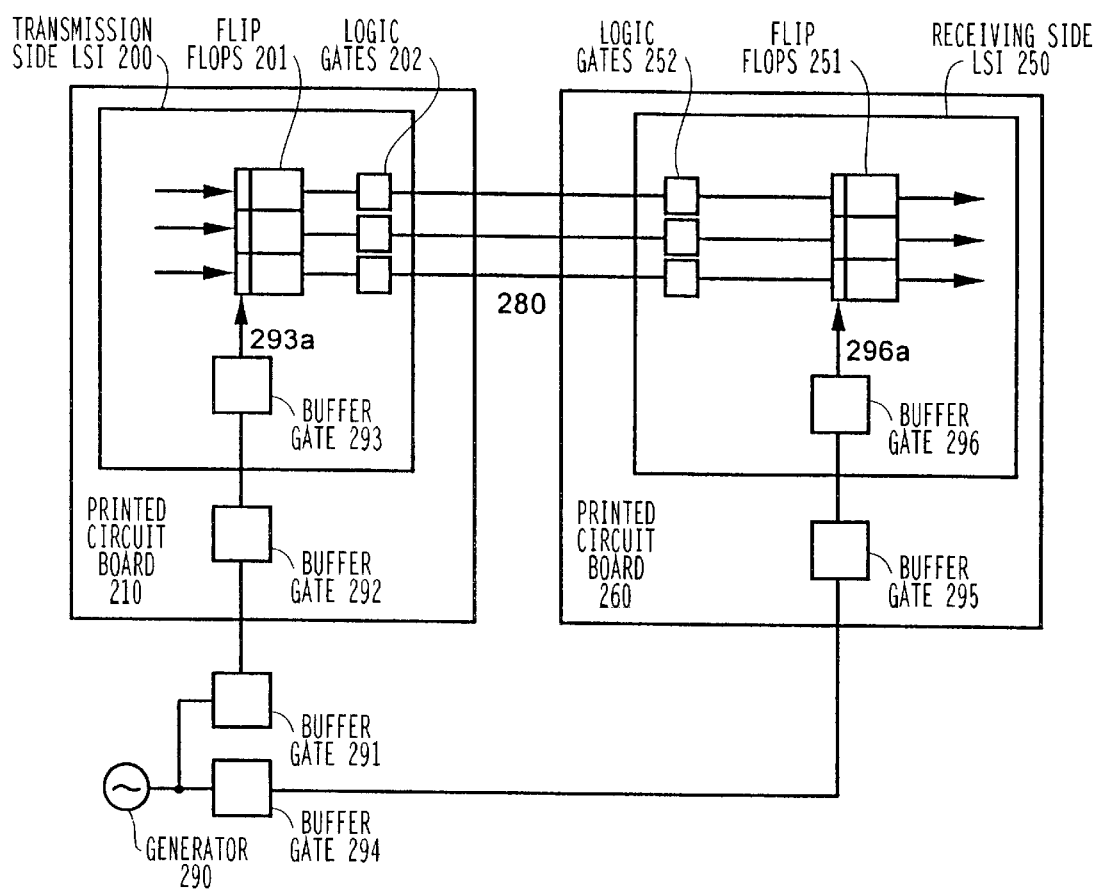
FIG. 2 is a block diagram of a data transmission system operating on a conventional synchronous transmission method.
Figure 3:
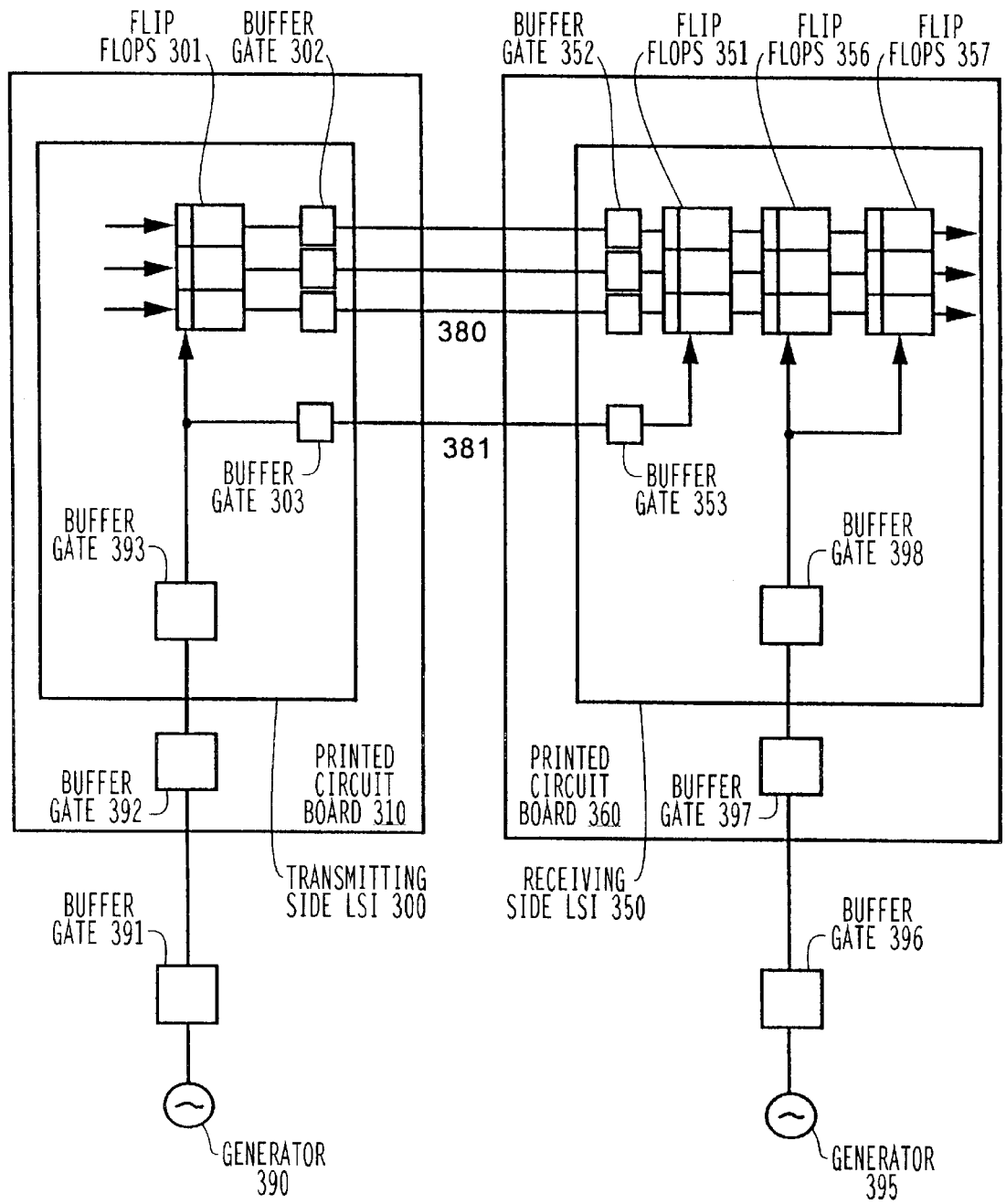
FIG. 3 is a block diagram of a data transmission system operating on a conventional simultaneous clock signal transmission method.

A common clock generator 30 generates a clock signal that is distributed via clock-distributing buffer gates 31 through 36 to the LSI's and to the printed circuit boards on both transmitting and receiving sides. The clock signal may illustratively be a reference clock signal used by a system that incorporates this kind of inventive data transmission facility. Specifically, the clock signal can be a system clock signal of a computer system, or a clock signal commonly supplied to processors constituting a parallel computer. As needed, the system clock signal may be divided by a divider for use with this embodiment.

A data signal directed from the transmitting side to the receiving side leaves a flip-flop group 11 in the transmitting-side LSI 10, passes through a transmission line group (data paths) 90 for data signal transfer, and reaches the receiving-side LSI 20. The transmission line group 90 is made up of as many transmission lines as the number of bits to be transmitted simultaneously. (Data signals sent over the transmission line group 90 may be called a data signal group hereunder.) Different data signals over the transmission lines remain in phase when transmitted from the flip-flop group.

Upon transmission of a data signal group, a reference signal generation circuit 50 generates a reference signal 50a that is transmitted simultaneously with the data signal group to the receiving-side LSI 20. The reference signal 50a, indicative of the phase of the data signal group, is sent over a transmission line 91. In this setup, arrangements are made so that the data signal group sent from the flip-flop group 11 to a phase amount adjustment circuit 22 is delayed by an amount as close as possible to that by which the reference signal is delayed when transferred from the reference signal generation circuit 50 to the phase amount adjustment circuit 40. Specifically, signal delays on the transmission lines 90 carrying the data bits are made to coincide with one another. The amount of delay on the reference signal transmission line 91 is made to match the amount of delay on the transmission line group 90. Furthermore, the number of logic gates 12 is adjusted so that delays between the flip-flops in the transmitting-side LSI 10 and the output pins of the LSI become substantially the same. Keeping the signal lines uniform in length on the printed circuit boards and between the boards (i.e. signal cables) renders the amount of delay identical for both the data signal group 90 and the reference signal 91. Likewise, comparable measures are taken on the receiving-side device so that the signal lines are made uniform in length on the printed circuit board and so that delays are made the same between the input pins and the phase amount adjustment circuit of the receiving-side LSI.

Upon receipt of a reference signal 40e, the receiving-side LSI 20 determines a phase in which the receiving-side flip-flop group may correctly retain the received data signal using a receiving-side clock signal based on the received reference signal. Specifically, the reference signal 40e passes through the phase amount adjustment circuit 40 that adjusts the signal in phase by a delay amount to be described later. The signal 40e is then input to a phase determination/phase amount control circuit 60 as a signal 40a. The phase determination/phase amount control circuit 60 compares in phase the signal 40a and a clock signal 36a of the receiving-side LSI 20. Based on the result of the comparison, the phase determination/phase amount control circuit 60 determines a delay amount (fed to the phase amount adjustment circuit 40) such that a predetermined phase relation develops between the clock signal 36a and the reference signal 40a. The delay amount thus determined is input to the phase adjustment circuit 40 which adjusts the reference signal 40a in phase. The delay amount applied to the reference signal 40e is also fed to a phase amount adjustment circuit group 22 so as to control the amount of delay in the received data signal group, whereby a receiving-side flip-flop group 21 retains the data signals correctly.

Figure 8:
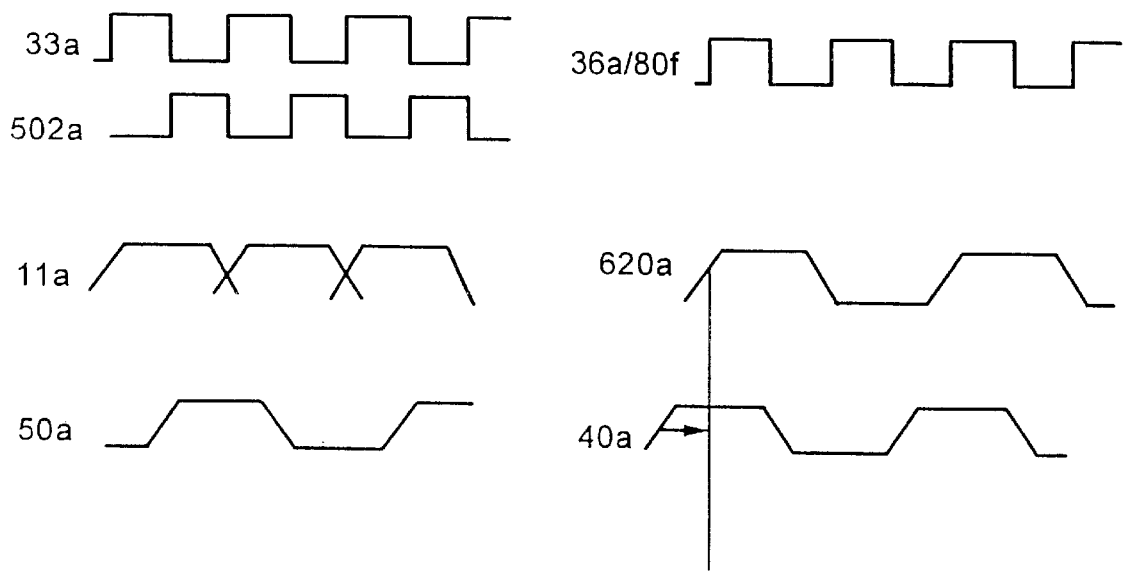
FIGS. 8 and 9 are timing charts in effect when phase amount adjustment is effected as proposed by the invention.

What follows is a more detailed description of the setup outlined above. The phase determination/phase amount control circuit 60 may be implemented by use of one of the following two schemes depending on the relation in phase difference between the data signal group and the reference signal:

(A) On the transmitting side, the phase difference between a data signal and the reference signal is controlled so that the switching edge of the reference signal is positioned in the middle of a minimum switching time of the data signal. This phase relation is commonly expressed as a phase difference being 90 degrees, as illustrated in FIG. 8. That is, the data signal 11a from the flip-flop group 11 is 90 degrees out of phase with the reference signal 50a from the reference signal generation circuit. In that case, the phase determination/phase amount control circuit 60 on the receiving side outputs phase control information to the phase adjustment circuit 40 adjusting the reference signal 40e in phase so that the output 40a of the circuit 40 will coincide in phase with the clock signal fed to the receiving-side flip-flop group 21 (refer to FIG. 8 for the relation between a phase signal 620a showing the phase of the receiving-side clock signal 36a on the one hand, and the output 40a of the phase amount adjustment circuit on the other hand). The phase control information is also sent to the phase amount adjustment circuit group 22 adjusting the phase of the data signal transmitted 90 degrees out of phase with the reference signal 40e. As a result, an exactly 90-degree out-of-phase relation effectively develops between the receiving-side clock signal 36a and the data signal 22a output after phase adjustment from the phase amount adjustment circuit group 22. This allows the flip-flop group 21 to receive the data signal group correctly.

Figure 9:
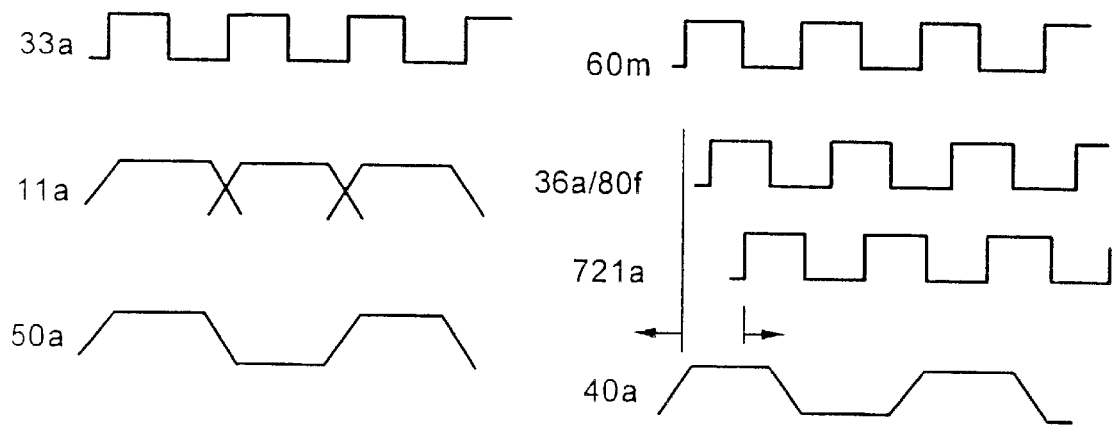

(B) On the transmitting side, the data signal to be transmitted is made to coincide in phase with the reference signal, as depicted in FIG. 9. That is, the data signal 11a from the flip-flop group 11 is made to coincide in phase with the reference signal 50a from the reference signal generation circuit. In that case on the receiving side, the phase determination/phase amount control circuit 60 outputs phase control information to the phase adjustment circuit 40 adjusting the reference signal 40e in phase so that the reference signal 40a will not coincide in switching timing with the received clock signal 36a fed to the flip-flop group 21 for flip-flop operation (refer to FIG. 9 for the relation between the clock signal 36a supplied to the flip-flop group 21 on the one hand, and the output 40a of the phase amount adjustment circuit on the other hand). More specifically, the phase control information to be output needs to be such that the switching edge of the receiving-side clock signal 36a will not correspond to that of the reference signal during a period flanked by a setup time of the flip-flops including time variations therebetween and by a hold time thereof. The phase control information is also sent to the phase amount adjustment circuit group 22 controlling the phase of the data signal group that is transmitted in phase with the reference signal 40e. As a result, the data signal 22a output after phase adjustment from the phase amount adjustment circuit group 22 has its switching edge in disagreement with that of the receiving-side clock signal 36a for operating the flip-flop group 21. This allows the flip-flop group 21 to receive the data signal group correctly.

The schemes (A) and (B) above have the following major characteristics: with the scheme (A), the receiving-side clock signal is controlled so as to coincide in phase with the reference signal. This can result in a huge amount of phase adjustment to be carried out depending on the system operation frequency in use. The massive phase adjustment can pose a restriction to the number of gates in constructing LSI's. With the scheme (B), the width of necessary delay amount is limited because the receiving-side clock signal need only be controlled so as to disagree in switching timing with the data signal. On the other hand, it is necessary with the scheme (B) precisely to avert a critical period before and after each clock edge by taking into consideration timing variations including clock skew. If the critical period is matched exactly with the delay amount, the scheme (B) needs fewer gates than the scheme (A) in implementing phase amount control.

The workings of the schemes (A) and (B) will now be described.

Figure 4:
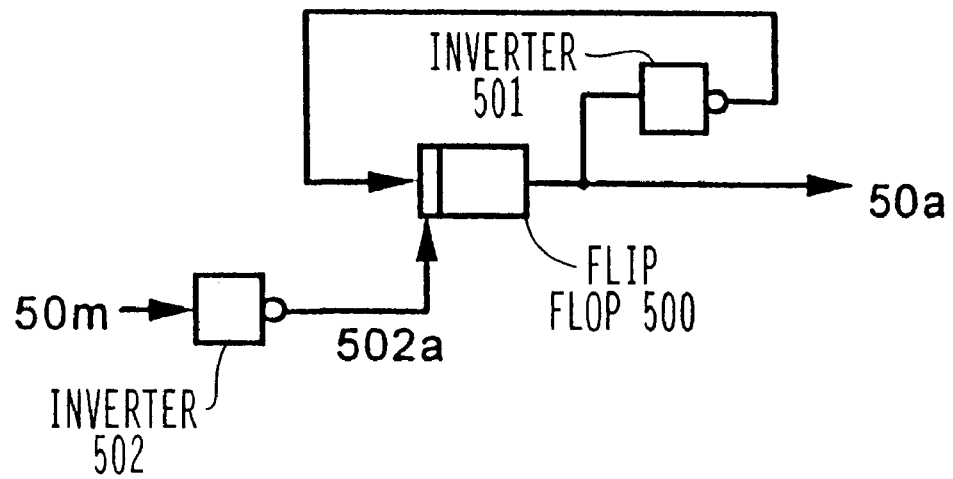
FIGS. 4 and 5 are block diagrams of a reference signal generation circuit proposed by this invention.

The reference signal generation circuit 50 for use with the scheme (A) is shown in detail in FIG. 4. The phase determination/phase amount control circuit with the scheme (A) in use is depicted in detail in FIG. 6. FIG. 8 is a timing chart of phase amount control with the scheme (A) in use.

The reference signal generation circuit 50 in FIG. 4 works as a one-bit counter. The clock signal to a flip-flop 500 of this counter is acquired by inverting the clock signal fed to the data signal flip-flop group 11. This means that the reference signal is to be output 90 degrees out of phase with the data signal. (The timing chart in FIG. 8 depicts the relation in phase between the data signal 11a from the flip-flop group 11 and the reference signal 50a from the reference signal generation circuit.)

Figure 6:
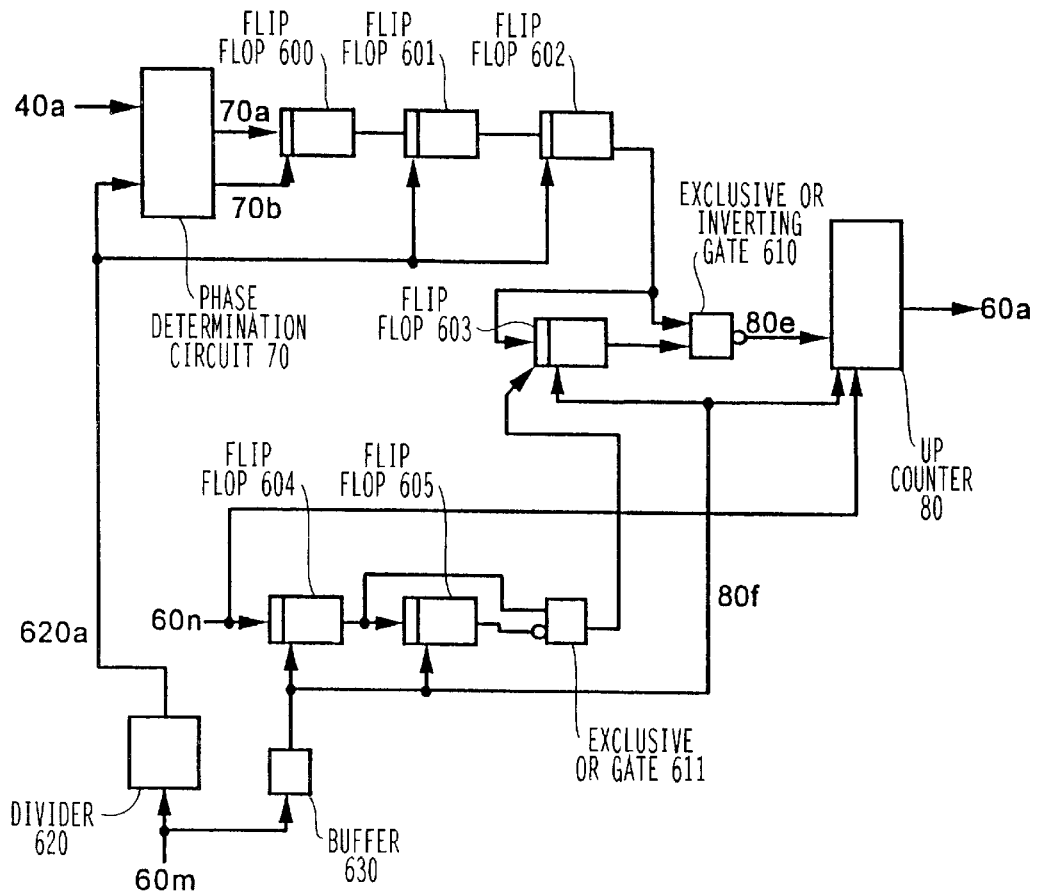
FIGS. 6 and 7 are block diagrams of a phase determination/phase amount control circuit proposed by the invention.
Figure 11:
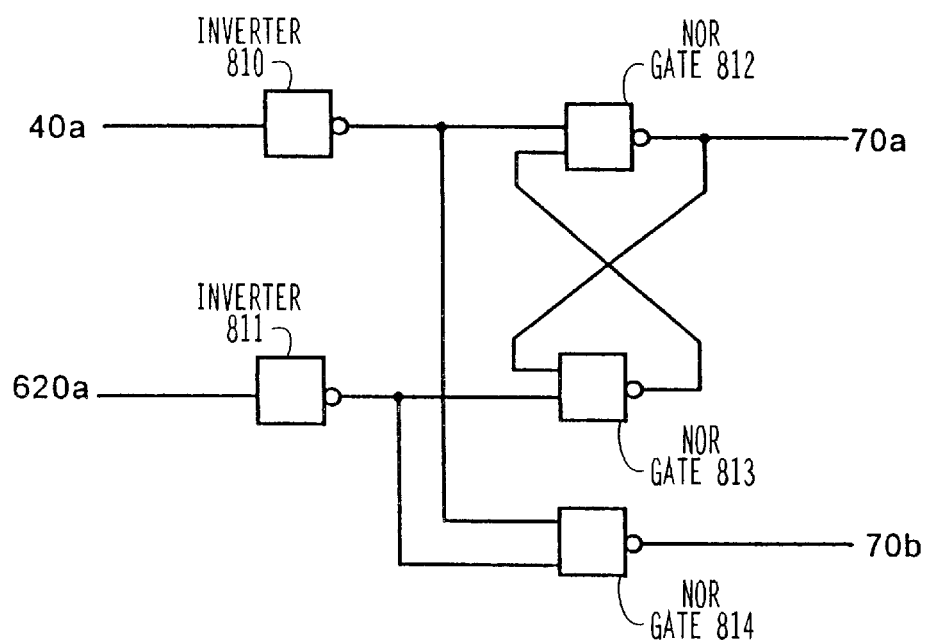
FIG. 11 is a block diagram of a phase determination circuit proposed by the invention.

FIG. 6 is a detailed block diagram of the phase determination/phase amount control circuit 60. A phase determination circuit 70 inside the circuit 60 determines a phase difference between the signal 40a obtained by the phase adjustment circuit 40 delaying the reference signal on the one hand, and a receiving-side clock signal 60m (in phase with the clock signal 36a) on the other hand. A circuit 620 is a divider that divides the receiving-side clock signal 60m by two to output a signal 620a (see signal 620a in the timing chart of FIG. 8). The signal 620a is in phase with the clock signal 36a that is supplied to the flip-flop group 21. The buffer gate 36 puts the two signals in phase with each other. If the reference signal 40a leads the clock signal 620a in phase, the phase determination circuit 70 sets a flip-flop 600 to "1" indicating the lead in phase. If the reference signal 40a lags the clock signal 620a, the phase determination circuit 70 sets the flip-flop 600 to "0" indicating the lag in phase. FIG. 11 is a block diagram of the phase determination circuit 70 acting as a simple RS type flip-flop that includes inverting gates 810 and 811 as well as NOR gates 812, 813 and 814. The gate 814 generates an order for setting the flip-flop 600 located downstream. The set order causes the flip-flop 600 to retain a determined phase result 70a. Thereafter, flip-flops 601 and 602 synchronize information thus retained so that logic circuits operating on the receiving-side clock signal may be controlled by the information.

A flip-flop 603 is a circuit that holds determined phase information about the reference signal 40a and about the receiving-side clock signals 620a and 36a in effect at the start of phase adjustment. What triggers the flip-flop 603 is a control signal acquired by flip-flops 604 and 605 differentiating leading edges of a phase adjustment enable signal 60n that is issued by a system control facility, not shown, at system startup. The flip-flop 603 when triggered holds the relation in phase between the reference signal 40a and the receiving-side clock signal 620a at phase adjustment startup.

An exclusive-OR inverting gate 610 keeps outputting a count-up signal 80e of "1" ordering an up-counter 80 to count up until the output of the flip-flop 602 and that of the flip-flop 603 become mutually exclusive, i.e., until the reference signal 40a coincides in phase with the receiving-side clock signal 620a.

Figure 7:
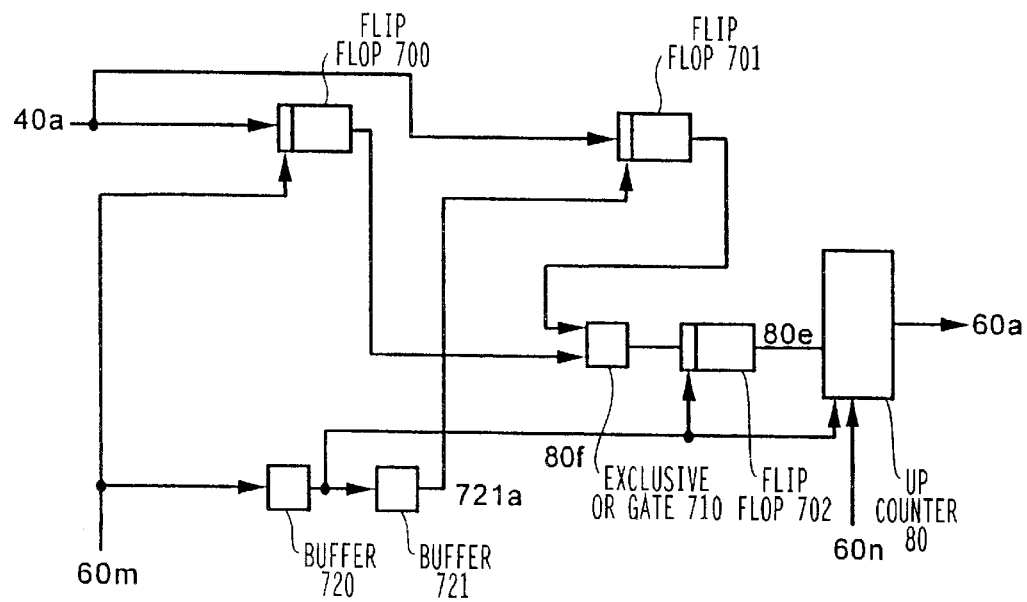
Figure 10:
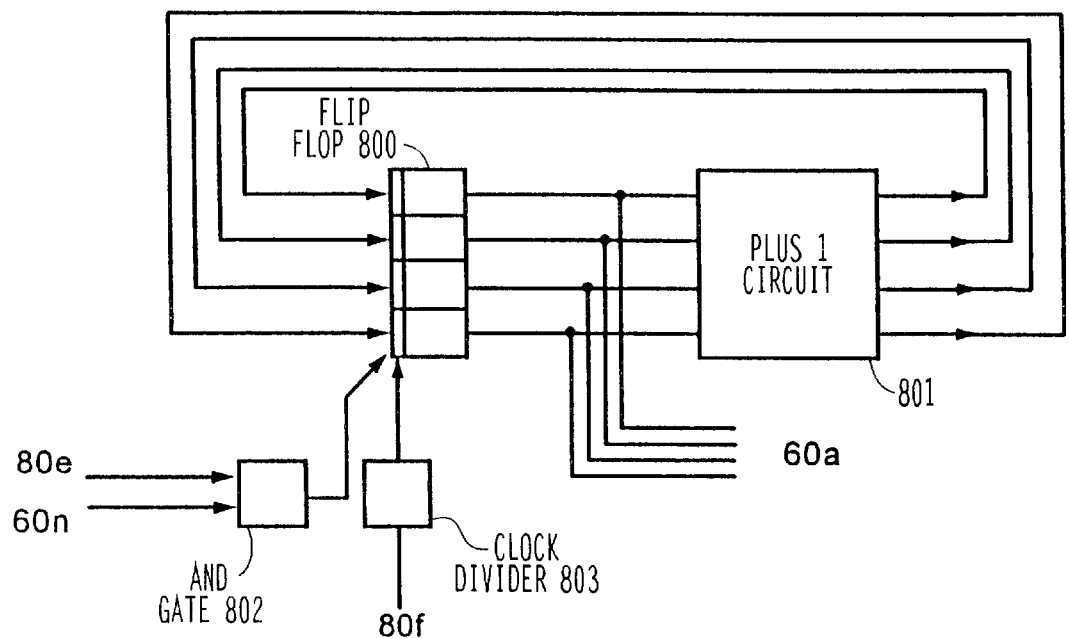
FIG. 10 is a block diagram of an up-counter proposed by the invention.

The up-counter 80 keeps incrementing its count value when the phase adjustment enable signal 60n is "1" enabling phase adjustment and while the count-up signal 80e is being "1." FIG. 10 shows an internal constitution of the up-counter 80. In FIG. 7, a flip-flop group 800 retains its count value, and a circuit 801 is a "plus 1" circuit that increments the count value by 1 at a time. An AND gate 802 keeps supplying the flip-flop group 800 with a control signal causing the group to output the retained count value when the phase adjustment enable signal 60n is "1" enabling phase adjustment and while the count-up signal 80e is being "1." The count value thus output is sent as an output 60a to the phase amount adjustment circuit 40 and is also incremented by the circuit 801 whose output is again retained in the flip-flop group 800. A clock divider (for division by 4) 803 is provided to keep the phase amount from getting too fast in adjustment pitch. The dividing ratio may be changed as needed.

The output 60a of the up-counter 80 is fed to the phase amount adjustment circuit 40 whereby the amount of delay in the reference signal 40e is increased. The output 40a of the phase amount adjustment circuit 40 is again supplied to the phase determination/phase amount control circuit 60.

It follows that the exclusive-OR inverting gate 610 feeds the up-counter 80 with "0" ordering a count-up halt when the relation in phase between the received reference signal 40e and the clock signal of the receiving-side LSI has changed (when the reference signal stops leading in phase the clock signal of the receiving-side LSI and starts lagging the latter, or vice versa), i.e., when the output of the flip-flop 602 and that of the flip-flop 603 become mutually exclusive. This stops the count-up process and eliminates any change in the signal to the phase amount adjustment circuit 40, whereby phase amount adjustment on the received reference signal 40e is stopped.

A change in phase relation between the received reference signal 40*e* and the clock signal of the receiving-side LSI signifies that the switching edges of the two signals compared have matched. Thus a growing amount of delay is input to the phase amount adjustment circuit 40 adjusting the reference signal 40*e* in phase. The increase in the input amount of delay is stopped when the signal 40*a* coincides with the receiving-side clock signal in phase. This determines the amount of delay by which the two signals are matched in switching edge. The delay amount thus determined is also fed to the phase amount adjustment circuit group 22 controlling the data signal group 22*e* in phase amount.

The phase amount adjustment circuit group 22 delays data signals by the amount based on the output of the phase determination/phase amount control circuit 60. That is, the data signal group is delayed by the same amount as the reference signal. This means that the delayed data signal group is 90 degrees out of phase with the reference signal that is also delayed. On the other hand, the delayed reference signal coincides in phase with the clock signal of the receiving-side LSI. This causes the delayed data signal group to be 90 degrees out of phase with the clock signal 36*a* of the receiving-side LSI. As a result, the flip-flop group 21 latching the data signal 22*a* from the phase amount adjustment control group 22 latches the data signal 22*a* substantially in the middle of a switching edge of that signal through the use of the clock signal change timing of the receiving-side LSI. The data signal 22*a* is thus retained correctly by the flip-flop group 21.

Figure 12:
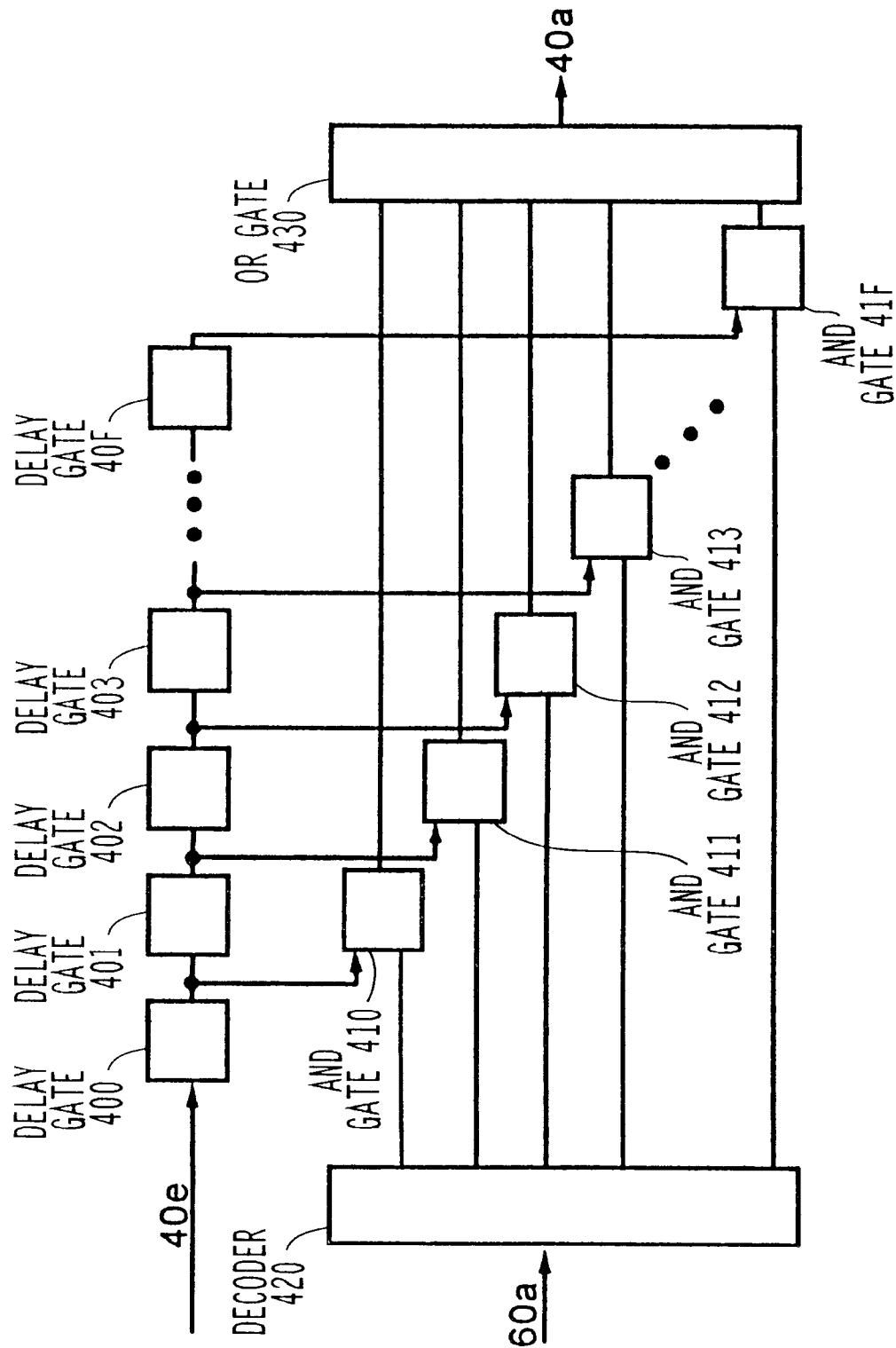
FIG. 12 is a block diagram of a phase amount adjustment circuit proposed by the invention.

FIG. 12 shows an internal constitution of the phase amount adjustment circuit groups 40 and 22. The phase amount adjustment circuit comprises delay gates (each having two inverting gates serially connected) 400 through 40F, AND circuits 410 through 41F, a decoder 420, and an OR circuit 430. With the phase amount adjustment circuit in operation, the decoder 420 first decodes a count value signal 60*a* from the up-counter 80. The decoded result is used as the basis for selecting outputs of the gates having delayed a signal input. In this manner, the input signal is delayed by the amount reflecting the count value. In FIG. 12, the input signal is illustratively the reference signal 40*e*.

In this embodiment, the phase amount adjustment circuit 22 is controlled with exactly the same amount of delay as the phase amount adjustment circuit 40. However, the two circuits may alternatively have different amounts of controlled delay. In the flip-flop 21, it is not mandatory for the clock edge 36*a* to be in the middle of the switching timing of the data signal group. If the setup time of the flip-flop 21 is greater than its hold time, the data may be retained correctly by having the clock edge 36*a* positioned past the middle of the input data. In such a case, the data signal is optimally delayed by a greater amount than the reference signal 40*e* transmitted simultaneously. Clearly, what is needed here is not to delay the data signal by the same amount as the reference signal all the time, but to determine an appropriate amount of delay for the data signal by taking into consideration the setup time and hold time of the flip-flop 21 on the basis of the delay applied to the reference signal.

The workings of the scheme (B) will now be described. The reference signal generation circuit 50 for use with the scheme (B) is shown in detail in FIG. 5. The phase determination/phase amount control circuit 60 with the scheme (B) in use is depicted in detail in FIG. 7. FIG. 9 is a timing chart of phase amount control with the scheme (B) in use.

Figure 5:
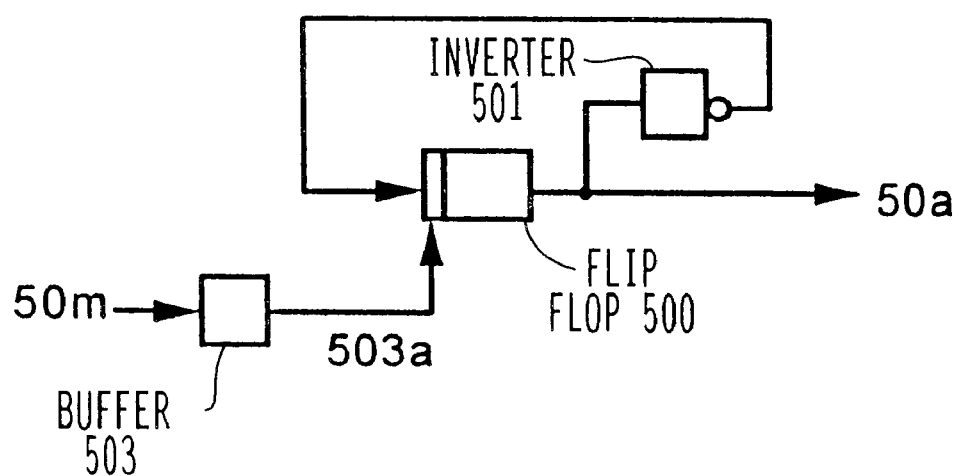

The reference signal generation circuit 50 in FIG. 5 acts as a one-bit counter. The clock signal to the flip-flop 500 of this counter is in phase with the clock signal supplied to the flip-flop group 11 for data signals. This means that the reference signal 50*a* generated by the reference signal generation circuit of FIG. 5 is transmitted in phase with the data signal. (The timing chart in FIG. 9 depicts the relation in phase between the data signal 11*a* from the flip-flop group 11 and the reference signal 50*a* from the reference signal generation circuit.)

FIG. 7 is a detailed block diagram of the phase determination/phase amount control circuit 60 applicable to the scheme (B). The phase determination/phase amount control circuit 60 of FIG. 7 comprises buffers 720 and 721 for delaying the clock signal 60*m* input to this circuit. The output signal 80*f* of the buffer 720 thus lags the clock signal 60*m* in phase, and the output signal 721*a* of the buffer 721 lags the output signal 80*f* of the buffer 720. The output signal 80*f* of the buffer 720 is in phase with the clock signal 36*a* fed to the flip-flop group 21. It follows that the input clock signal 60*m* to the buffer 720 leads the clock signal 36*a* in phase and that the output 721*a* of the buffer 721 lags the clock signal 36*a*. The phase difference between the clock signal 36*a* and the input clock signal 60*m* is set to be greater than the setup time of the flip-flop group 21. The phase difference between the clock signal 36*a* and the output 721*a* is established to be greater than the hold time of the flip-flop group 21.

The above three clock signals with mutually different phases allow the flip-flop group 21 to determine when to admit the data signal. The timing thus determined defines in turn a time period in which the switching timing of the receiving-side clock signal 36*a* fed to the flip-flop group 21 is to avert the switching timing of the data signal admitted into the same flip-flop group 21.

More specifically, the following takes place: at the start (corresponding to the input clock signal 60*m*) of the above time period (a phase shift between the input clock signal 60*m* and the output 721*a*), the value of the received reference signal 40*a* is accepted into the flip-flop 700. At the end (corresponding to the output 721*a*) of the above period, the value of the received reference signal 40*a* is admitted to the flip-flop 701. If the value held by the flip-flop 700 is found to differ from the value retained by the flip-flop 701, it indicates a change that occurred in the reference signal 40*a* during the period where the two flip-flops were fed with their clock signals (i.e., input clock signal 60*m* and output 721*a*). In such a case, the data signal in phase with the reference signal has also changed during the same period. This leads to a possibility that the data signal may coincide in change timing with the receiving-side clock signal 36*a*. If that is the case, then the data signal group 22*a* cannot be held correctly by the flip-flop group 21 using the receiving-side clock signal 36*a*. To have the data signal group 22*a* retained correctly by the flip-flop group 21 requires keeping the reference signal 40*a* unchanged from the time the flip-flop 700 is fed with its clock signal until the flip-flop 701 is given its clock signal. That is, the value held by the flip-flop 700 must be the same as the value retained by the flip-flop 701. If the reference signal is kept unchanged, the data signal in phase with that signal also remains the same during the period in question. With the data signal different from the receiving-side clock signal 36*a* in change timing, the clock signal 36*a* allows the flip-flop group 21 to hold the value of the data signal group 22*a* correctly.

An exclusive-OR gate 710 checks to see if the output of the flip-flop 700 matches that of the flip-flop 701. In the event of a match, the data signal is deemed to have been admitted correctly to the flip-flop group 21. Then the exclusive-OR gate 710 does not output a signal ordering phase adjustment of the reference signal. In case of a mismatch between the two flip-flop outputs, the exclusive-OR gate 710 produces a signal ordering the reference signal to be adjusted in phase. The output of the gate 710 is fed through a flip-flop 702 to the up-counter 80 as the count-up order signal 80e. The output (delay amount) 60a of the up-counter 80 is supplied to the phase amount adjustment circuit 40 increasing the phase amount of the reference signal. With the reference signal 40a thus raised progressively in phase amount, the output of the flip-flop 700 eventually matches that of the flip-flop 701. At that point, the exclusive-OR gate 710 stops issuing the signal ordering phase adjustment of the reference signal. From that time on, the output (delay amount) 60a of the up-counter 80 remains constant. The flip-flop 702, controlled by the clock signal 80f, holds the output of the exclusive-OR gate 710.

The delay amount thus made constant puts the reference clock 40e in disagreement with the receiving-side clock signal 36a in terms of switching timing. The delay amount is also input to the phase amount adjustment circuit 22 that delays the received data signal group 22e in phase. This causes the received data signal group 22e to be delayed by the same amount as the reference signal. The data signal group 22a from the phase amount adjustment circuit 22 does not coincide in switching timing with the receiving-side clock signal 36a fed to the flip-flop group 21. As a result, the flip-flop group 21 retains the value of the data signal group 22a correctly. This completes the workings of the scheme (B).

Although the example of FIG. 1 shows unidirectional data transmission from the LSI 10 to the LSI 20, data may be transmitted in the opposite direction by rearranging the same setup. Specifically, data transmission in the reverse direction may be implemented by furnishing the LSI 20 with the reference signal generation circuit 50, by providing the LSI 10 with the phase amount adjustment circuits 40 and 22 as well as the phase determination/phase amount control circuit 60, and by installing data/reference signal transmission lines directed from the LSI 20 to the LSI 10. The alternative setup permits data transmission in the opposite direction using the above-described schemes. Putting together the forward and the opposite direction data transmission setups constitutes a full-duplex data transmission arrangement.

Figure 13:
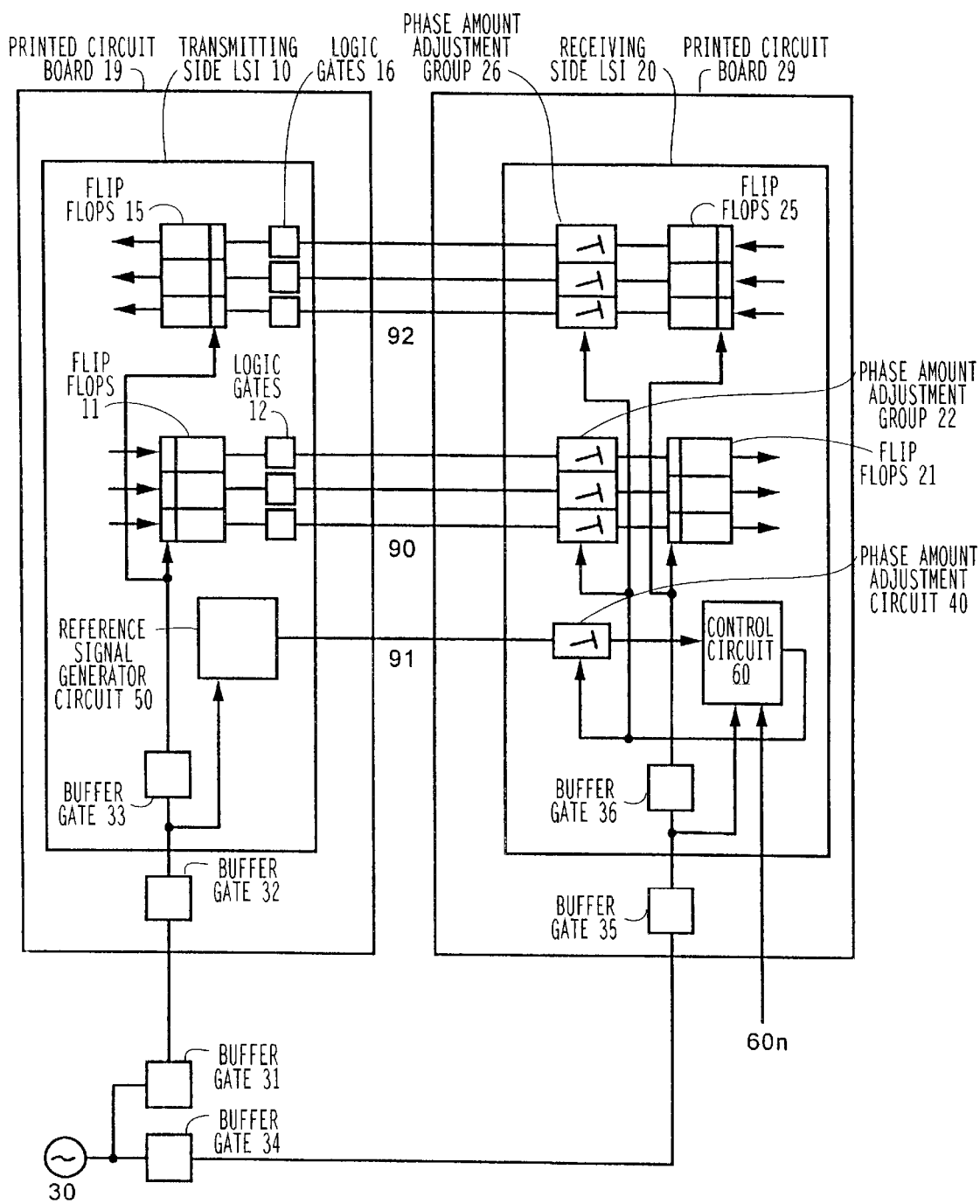
FIG. 13 is a block diagram of a data transmission facility proposed by the invention to implement full-duplex data transmission.

FIG. 13 shows another alternative data transmission facility that efficiently implements full-duplex data transmission. In this setup, the structure for transmitting data from the LSI 10 to the LSI 20 and for adjusting the amount of delay is the same as described with reference to FIG. 1. What characterizes the setup of FIG. 13 is that for full-duplex data transmission, a data transmission feature in only one of the two connected LSI's determines the amount of delay and performs delay-related operations. More specifically, the reference signal generation circuit is furnished only in the LSI 10; the LSI 20 alone comprises the phase determination/phase amount control circuit 60, the phase amount adjustment circuit 40 for the received reference signal, the phase amount adjustment circuit 22 for the received data signal, and a phase amount adjustment circuit group 26 intended for the transmitted data signal and having the same constitution as the circuits 40 and 22. In this case, data signal group transmission lines 92 and 90 for data transmission in the forward and opposite directions are designed to have the same delays in absolute values. When the amount of delay for the data signal group is determined by the phase determination/phase amount control circuit 60 in the LSI 20, with the same delay amount supplied to the phase adjustment circuit groups 22 and 26, the receiving flip-flop groups 21 and 15 receive the data correctly. That is, in the setup of FIG. 13, the data signal sent over the transmission lines 90 is delayed in phase by the receiving side while the data signal conveyed over the transmission lines 92 is delayed in phase by the transmitting side. This allows the receiving flip-flop groups 21 and 15 to receive the data signals correctly. The setup of FIG. 13 is also advantageous in that it allows complex circuitry such as the phase amount adjustment circuit to be concentrated in a specific facility (equipment), whereby the construction of a target system is made easier.

Figure 14:
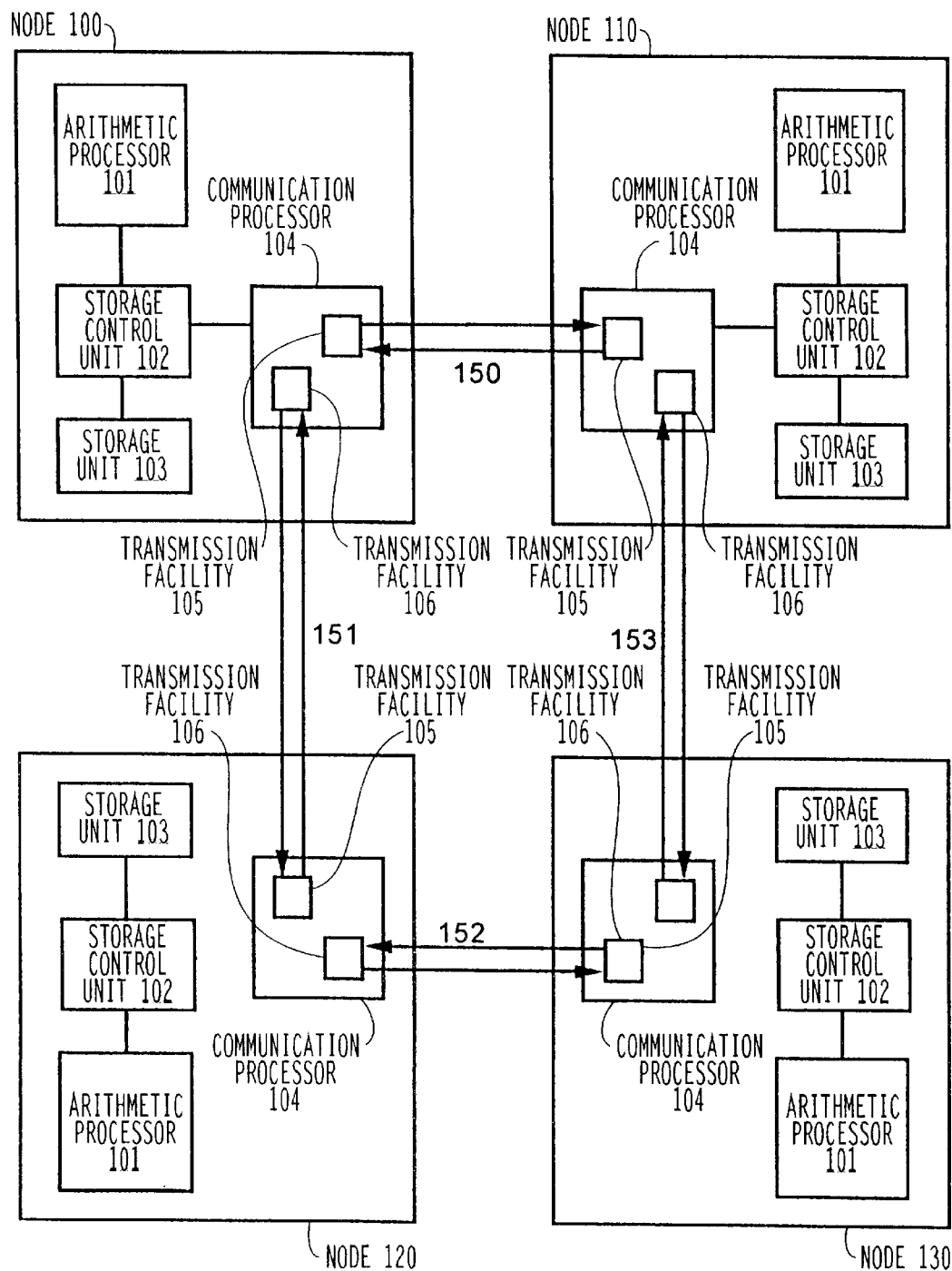
FIG. 14 is a block diagram of a parallel processor proposed by the invention and adopting a phase amount adjustment feature for data transmission.
Figure 15:
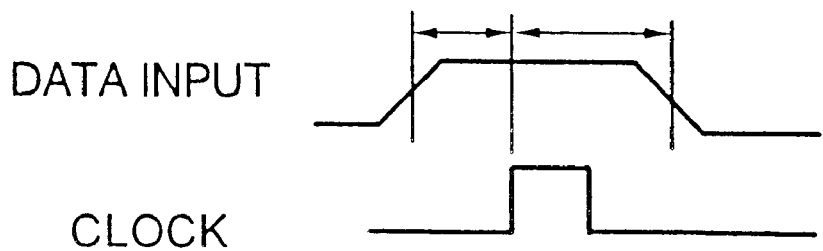
FIG. 15 is a view illustrating how times Ts and Th are defined for flip-flops in FIG. 2.

FIG. 14 depicts a typical constitution of a parallel processor system to which this invention is applied. Shown in FIG. 14 is a system comprising four nodes and a network interconnecting these nodes. Each node includes an arithmetic processor 101, a communication processor 104, a storage control unit 102 and a storage unit 103. The interior of the node is designed on the basis of the first conventional data transmission method discussed in connection with the background art. The conventional method is adopted here in view of the fact that the components inside the node are physically close to one another involving massive interface. In this particular case, designing the node based on the conventional method turns out to be efficient and saves design time. Data transmission between the nodes is accomplished by each communication processor 104 that incorporates data transmission facilities 105 and 106 having the phase amount adjustment circuit according to the invention. Unlike the conventional clock synchronized transmission method, the inventive data transmission method based on phase adjustment eliminates the need for designing a clock distribution section to suppress clock skew in the system. Furthermore, systems adopting the inventive method may be designed with less hardware than those adopting the conventional simultaneous clock signal transmission method. Within a system, the clock synchronized transmission method may be used to implement data transmission in physically closed locations (e.g., inside a processor node) while the phase amount adjustment feature may be employed for data transmission in physically expansive areas such as between processor nodes. These arrangements make it possible to design a large-scale yet high-speed system in a short design time and with limited design work.

The inventive method tends to be more advantageous the higher the level of circuit integration in the LSI and the greater the number of pins attached thereto. The reason for this is that with more data (wider bit width) accommodated by each chip, this invention is applicable to systems on an ever-wider scale. The magnitude of skew is mostly determined by disparities in the manufacturing process. It follows that the amount of skew in a single-chip setup handling data of a given bit width is considerably smaller than in a multiple-chip setup addressing the same bit width. As a result, data is transmitted at higher speeds than ever between the data transmission facilities. This invention will thus grow in its value and importance as semiconductor devices become even greater in circuit integration and carry an ever-increasing number of pins from now on.

As opposed to the clock synchronized transmission method, the method and apparatus of the present invention eliminate the need for designing a clock distribution section to suppress clock skew in the system. With no need for low-skew circuits for clock distribution, the target system may be constituted using an inexpensive clock supply setup. Because massive detours of signal wiring patterns or signal cables are unnecessary for the data transmission lines, implementation arrangements are inexpensive with the amount of necessary hardware reduced.

Unlike the conventional simultaneous clock signal transmission method, the method and apparatus of the invention have no need for being conscious of the metastable state of data signal flip-flops. With no need to furnish two-stage flip-flop arrangements, high-speed (low-latency) data transmission is implemented using hardware of a limited scale.

According to the invention, controls are effected so that the switching timing of the received data will not correspond to a specific period including clock edges of the receiving-side flip-flops. The arrangement suppresses the amount of phase shift that needs to be adjusted. This translates into a reduction in the quantity of gates constituting the phase amount adjustment feature.

Where the inventive phase amount adjustment feature is adopted for full-duplex data transmission between two data transmitting devices, the adjustment feature may be concentrated in only one of the two devices. This eases the complexity of implementing the inventive method in a target system, whereby the amount of design work is reduced. Because delay determination circuits are shared by system components, the quantity of gates making up the phase amount adjustment features for the entire system may also be lowered.

According to the invention, the clock synchronized transmission method is applied to physically closed locations while the phase amount adjustment feature covers physically expansive areas. The selective application of the methods makes it possible to implement a large-scale yet high-speed system with a reduced amount of design work and a limited quantity of hardware.

INDUSTRIAL APPLICABILITY

The present invention is applied advantageously to data signal transmission devices, particularly to data transmission apparatuses for parallelly transmitting data signals of a plurality of bits. Illustratively in a parallel processor system wherein physically closed locations are addressed by one mode of data transmission and physically expansive areas are covered by another mode, the invention effectively implements the latter mode of data transmission.

What is claimed is:

1. A data transmission apparatus comprising:
   a transmitting device;
   a receiving device; and
   a data transmission line for transmitting a data signal from said transmitting device to said receiving device,
   wherein said transmitting device has a signal circuit which outputs a first signal having a specific relation in phase to said data signal,
   wherein said first signal is sent from said transmitting device to said receiving device over a signal transmission line, said data transmission line and said signal transmission line being devised so that phase differences between said data signal and said first signal fall within a predetermined range, and
   wherein said receiving device comprises:
      a plurality of registers which receive a second data signal in response to a clock signal of said receiving device,
      a determination circuit which determines relations between said clock signal and said first signal, and
      a phase adjustment circuit which adjusts said data signal in phase based on said relations determined by said determination circuit and outputs the adjusted signal as said second data signal.

2. A data transmission apparatus according to claim 1, wherein said determination circuit determines relations in phase between said clock signal and said first signal.

3. A data transmission apparatus according to claim 1, wherein said signal circuit outputs said first signal that is out of phase with said data signal by an amount corresponding to a period of time required by said registers to receive said data signal; and wherein said determination circuit checks to see if there is a match in switching edge between said clock signal and said first signal, said determination circuit further causing said phase adjustment circuit to adjust said data signal in phase in the event of a switching edge mismatch, said phase adjustment circuit further outputting the adjusted signal as said second data signal.

4. A data transmission apparatus according to claim 1, wherein said signal circuit outputs said first signal of which the phase is controlled so that a switching edge of said first signal is positioned in the middle of a minimum switching time of said data signal; and wherein said determination circuit checks to see if there is a match in switching edge between said clock signal and said first signal, said determination circuit further causing said phase adjustment circuit to adjust said data signal in phase in the event of a switching edge mismatch, said phase adjustment circuit further outputting the adjusted signal as said second data signal.

5. A data transmission apparatus according to claim 1, wherein said signal circuit outputs said first signal which is substantially in phase with said data signal; and wherein said determination circuit checks to see if a switching edge of said first signal falls within a specific period including a switching time of said clock signal, said determination circuit further causing said phase adjustment circuit to adjust said data signal in phase in the event of the switching edge of said first signal falling within said specific period, said phase adjustment circuit further outputting the adjusted signal as said second data signal.

6. A data processing system comprising:
   at least two transmitting-receiving devices interconnected for transmitting and receiving data signals of a plurality of bits therebetween in a bidirectional parallel data transfer,
   wherein one of said at least two transmitting-receiving devices comprises:
      a first transmission circuit which transmits a first data signal of a plurality of bits in response to a first clock signal,
      a first reception circuit which receives a fourth data signal of a plurality of bits in response to said first clock signal, and
      a signal circuit which outputs a first signal having a specific relation in phase to said first data signal;
   wherein the other of said at least two transmitting-receiving devices comprises:
      a second reception circuit which receives a second data signal of a plurality of bits in response to a second clock signal,
      a second transmission circuit which transmits a third data signal of a plurality of bits in response to said second clock signal,
      a determination circuit which determines relations in phase between said second clock signal and said first signal,
      a first phase adjustment circuit which adjusts said first data signal in phase based on said relations determined by said determination circuit and outputs the adjusted signal as said second data signal, and a second phase adjustment circuit which adjusts said third data signal in phase based on said relations determined by said determination circuit and outputs the adjusted signal as said fourth data signal; and wherein, between said at least two transmitting-receiving devices, said first data signal is transmitted over a first transmission line, said fourth data signal is sent over a second transmission line, and said first signal is conveyed over a third transmission line said first, said second and said third transmission lines being devised so that phase differences of said first signal over the respective lines fall within a predetermined range.

7. A parallel processor comprising:

a plurality of processing nodes; and a communication network for interconnecting said plurality of processing nodes;

wherein a local processing node comprises:
 a transmission circuit which transmits a first data signal,
 a signal circuit which transmits a first signal having a specific relation in phase to a data signal to be transmitted
 a plurality of registers which receives a second data signal in response to a clock signal of said local processing node,
 a determination circuit which determines relations between said clock signal and the first signal transmitted from another processing node, and
 a phase adjustment circuit which adjusts said first data signal in phase from said another processing node based on said relations determined by said determination circuit and outputs the adjusted signal as said second data signal; and wherein said communication network interconnecting said processing nodes comprises:
 a data transmission line which transmits said first data signal and a signal transmission line which transmits said first signal, said data transmission line and said signal transmission line being devised so that phase differences between said data signal and said first signal fall within a predetermined range.

8. A data transmission method for use with a system comprising a transmitting device, a receiving device, and data transmission lines for transmitting a data signal from said transmitting device to said receiving device, said data transmission method comprising the steps of:

causing said transmitting device to output a first signal having a specific relation in phase to said data signal by use of a transmission line devised so that phase shift differences between said data signal over said data transmission line and said first signal over said transmission line fall within a predetermined range; and causing said receiving device to determine relations between a clock signal of said receiving device and said first signal, to adjust said data signal in phase on the basis of the determined relations in order to output the adjusted signal as a second data signal, and to receive said second data signal in response to said clock signal.

* * * * *